United States Patent [19]
Platner et al.

[11] Patent Number: 5,701,117
[45] Date of Patent: Dec. 23, 1997

[54] OCCUPANCY DETECTOR

[75] Inventors: Brian Page Platner, 100 Trailwood Dr., Guilford, Conn. 06437; Philip Howland Mudge, Brookfield, Conn.

[73] Assignee: Brian Page Platner, Guilford, Conn.

[21] Appl. No.: 588,576

[22] Filed: Jan. 18, 1996

[51] Int. Cl.[6] ............................................. G08B 13/18
[52] U.S. Cl. ............................. 340/567; 250/DIG. 1; 340/522; 340/529
[58] Field of Search ........................ 340/567, 540, 340/522, 529, 309.15; 250/DIG. 1; 315/307, 297; 362/802, 276; 381/56, 57

[56] References Cited

U.S. PATENT DOCUMENTS

| | | | |
|---|---|---|---|
| 3,936,822 | 2/1976 | Hirschberg | 340/522 |
| 4,223,832 | 9/1980 | Szarka | 236/49.5 |
| 4,630,684 | 12/1986 | Cinzori et al. | 169/46 |
| 4,703,171 | 10/1987 | Kahl et al. | 340/567 X |
| 4,746,906 | 5/1988 | Lederer | 340/522 |
| 4,772,875 | 9/1988 | Maddox et al. | 340/522 |
| 4,825,079 | 4/1989 | Takamatsu et al. | 250/338.3 |
| 4,890,093 | 12/1989 | Allison et al. | 340/567 |
| 4,975,584 | 12/1990 | Benjamin et al. | 250/372 |
| 5,015,994 | 5/1991 | Hoberman et al. | 340/567 |
| 5,023,593 | 6/1991 | Brox | 340/522 |
| 5,128,654 | 7/1992 | Griffin et al. | 340/567 |
| 5,142,199 | 8/1992 | Elwell | 315/154 |
| 5,153,560 | 10/1992 | Ichikawa | 340/522 |
| 5,189,393 | 2/1993 | Hu | 340/522 |
| 5,266,807 | 11/1993 | Neiger | 250/353 |
| 5,276,427 | 1/1994 | Peterson | 340/522 |
| 5,307,051 | 4/1994 | Sedlmayr | 340/573 |
| 5,386,210 | 1/1995 | Lee | 340/567 |
| 5,428,345 | 6/1995 | Bruno | 340/567 X |
| 5,534,850 | 7/1996 | Lee | 340/567 X |

Primary Examiner—Thomas Mullen
Attorney, Agent, or Firm—Thomas L. Secrest; Christopher J. Harnett; Garry J. Tuma

[57] ABSTRACT

The present invention relates to an occupancy detector device that is capable of regulating the on/off status of electrical appliances, such as lights, depending on the presence of people in a given monitored area. The occupancy detector of the present invention relies on the combined functioning of a passive infrared sensor and a sound sensor. Signals from the passive infrared sensor or the sound sensor operate to maintain the electrical appliances in the on state. If no signals are received from these sensors after a predetermined time interval, the off state of the electrical appliances is initiated. Following the initiation of the off state there may be a predetermined grace period during which a sound signal can reinitiate the on state of the electrical appliance. If no sound signal is received during that grace period, only a signal from the passive infrared sensor can subsequently reinitiate the on state. The sound detector of the present invention may be adapted with an "automatic gain control" feature by which background noise is filtered out and does not maintain or initiate the on state of the electrical appliances.

21 Claims, 3 Drawing Sheets

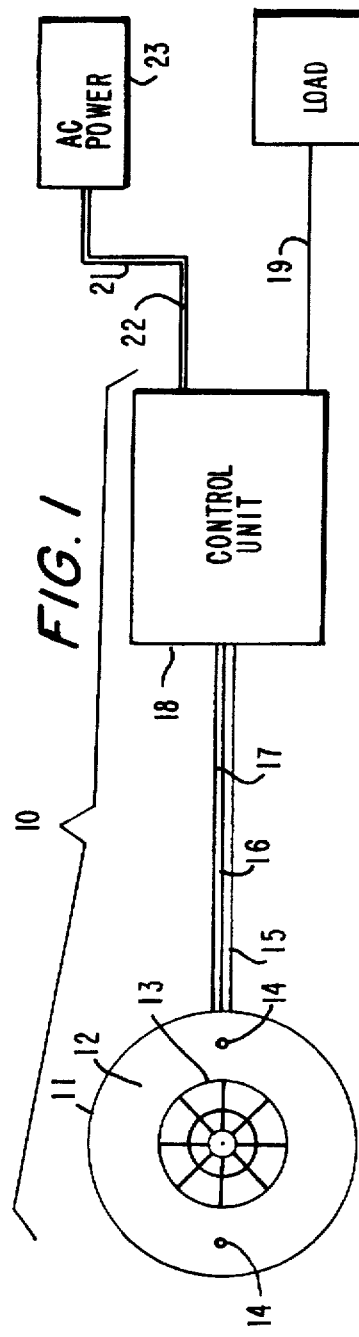
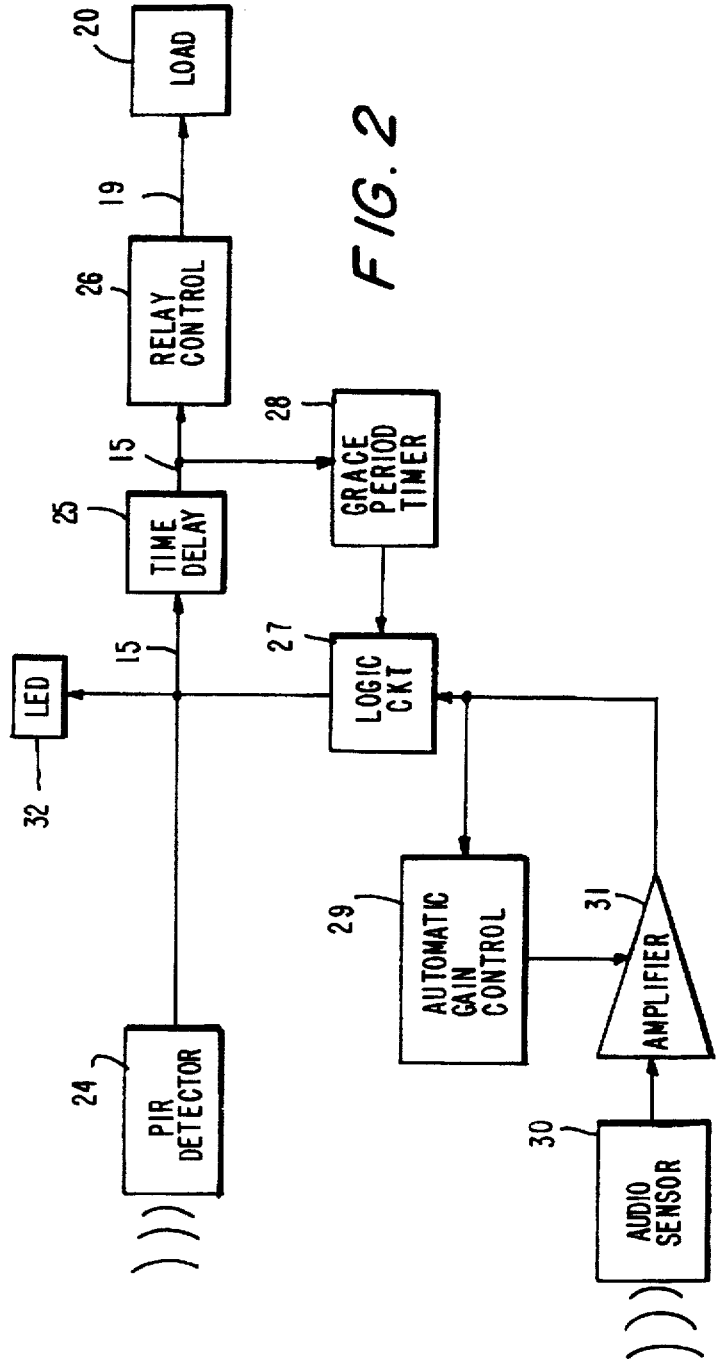

OCCUPANCY DETECTOR

BACKGROUND OF THE INVENTION

As a result of dramatically increasing costs associated with electrical energy, technologists have developed devices that automatically activate and deactivate electrical appliances such as lights depending on when they are needed. The most rudimentary devices comprise a timer that automatically activates and deactivates the appliances at predetermined time intervals. More sophisticated "occupancy detector" devices have been developed that can sense when a person is present in a specified area and can trigger the activation and deactivation of appliances accordingly.

Many of the occupancy detector devices that have been developed to date have formidable drawbacks. For example, devices that rely upon ultrasonic detectors require time-consuming and intricate sensitivity adjustments. Ultrasonic devices have been considered to be advantageous because ultrasonic sound waves allow an occupancy detector to "see" around obstructions and partitions. However, due to variable sensitivities, ultrasonic devices have a tendency to unnecessarily trip the lighting or other appliances into the on state during periods where the monitored area is unoccupied, thereby reducing the energy efficiency of the device.

The sensitivity of ultrasonic devices can be influenced by temperature and humidity, and the functioning of such devices can be affected by the furnishings of the monitored area. In situations where the monitored area has few reflective surfaces, it may be necessary to increase the sensitivity of the ultrasonic detector. In such circumstances, incidents of false tripping may increase. Moreover, health authorities, including the World Health Organization, have expressed concern over prolonged exposure to the high frequency sound waves emitted by ultrasonic sensors.

Passive infrared sensors are generally considered to be superior to ultrasonic sensors with respect to false tripping reliability. However, passive infrared sensors are not well suited for use in areas with partitions or obstructions such as, for example, file rooms, divided work areas and bathrooms with stalls.

Light (or "photoelectric") sensors that can trigger the on/off function of appliances when a constant beam of light is interrupted by, for example, the movement of a person in a monitored area, are well known. Those devices, however, are also unsuitable for use in partitioned areas and a single photoelectric sensor may not be sufficient to cover a large room. Audio sensors are also well known but do not perform well in situations where a person occupying an area is engaged in quiet activities. Audio sensors also have the tendency to unnecessarily initiate the on state in response to noises from the outside environment.

The inherent limitations in the individual sensor technologies have led some workers to combine sensor technologies. For example, U.S. Pat. No. 5,386,210 issued to Lee, describes an occupancy detector that includes a passive infrared sensor, a sound sensor, and a sensor capable of detecting the ambient light level. While the Lee device does solve many of the problems inherent in individual sensors, that device has several limitations.

For example, if the Lee device is deployed to control lighting in a given room, a person working quietly behind a partition may find themselves in the dark, unable to activate the lights other than by repositioning themselves in the line of "sight" of the passive infrared sensor. The Lee device does not allow for a "grace period" following the initiation of the off state during which a sudden sound—such as a shout by a person startled by lights being deactivated—can reinitiate the on state. This limitation of the Lee device presents obvious safety concerns.

Moreover, devices such as those described by Lee have limitations relating to sensitivity control of the sound sensor. Any sound of an intensity above a predetermined threshold level, including background noise, may trigger the continuation of lights or other appliances in the on state. The Lee device and other available occupancy detectors are not equipped to automatically adjust the sound sensor to filter out background noise, and therefore do not perform at an optimal level in terms of energy conservation.

Devices such as those described in U.S. Pat. No. 5,189,393 issued to Hu, combine ultrasonic and passive infrared detectors. While those devices perform better than ultrasonic or passive infrared devices alone, the problems of, for example, variable sensitivities and possible health consequences have not been eliminated.

In light of the foregoing, it would be desireable to provide a reliable device that can regulate the on/off status of lights and other electrical appliances that can detect the presence of a person in a monitored area that does not require repeated sensitivity adjustments.

It would also be desireable to provide a reliable device that can regulate the on/off status of lights and other electrical appliances that eliminates the need for ultrasonic detectors.

It would also be desireable to provide a reliable device that can regulate the on/off status of lights and other electrical appliances that employs a combination of passive infrared and sound detectors.

It would also be desireable to provide a reliable device that can regulate the on/off status of lights and other electrical appliances that is capable of differentiating between background noise and sounds associated with the presence of a person within the monitored area.

It would also be desireable to provide a reliable device that can regulate the on/off status of lights and other electrical appliances in which, following the deactivation of the lights or other electrical appliances, the on state may be reactivated by a sudden sound (such as a human shout) within a predetermined "grace period" following deactivation.

It would also be desireable to provide a reliable device that can regulate the on/off status of lights and other electrical appliances that operates to initiate the off state of the lights or electrical appliances at a specified and adjustable time interval after all persons have left a given monitored area.

SUMMARY OF THE INVENTION

It is an object of the present invention to provide a reliable device that can regulate the on/off status of lights and other electrical appliances that can detect the presence of a person in a monitored area that does not require repeated sensitivity adjustments.

It is also an object of the present invention to provide a reliable device that can regulate the on/off status of lights and other electrical appliances that eliminates the need for ultrasonic detectors.

It is also an object of the present invention to provide a reliable device that can regulate the on/off status of lights and other electrical appliances that employs a combination of passive infrared and sound detectors.

It is also an object of the present invention to provide a reliable device that can regulate the on/off status of lights and other electrical appliances that is capable of differentiating between background noise and sounds associated with the presence of a person within the monitored area.

It is also an object of the present invention to provide a reliable device that can regulate the on/off status of lights and other electrical appliances in which, following the deactivation of the lights or other electrical appliances, the on state may be reactivated by a sudden sound (such as a human shout) within a predetermined "grace period" following deactivation.

It is also an object of the present invention to provide a reliable device that can regulate the on/off status of lights and other electrical appliances that operates to initiate the off state of the lights or electrical appliances at a specified and adjustable time interval after all persons have left a given monitored area.

In accordance with the foregoing objects, we provide an occupancy detector that may be deployed to regulate the on/off function of electrical appliances such as lighting devices. The present occupancy detector employs dual passive infrared and sound detection technology that allows for reliable operation without "false tripping" of the electrical appliance and that eliminates the need for intricate and time-consuming sensitivity adjustments.

The passive infrared detector component is sensitive to the heat differential between a person and the surrounding environment. When a person is detected, a signal is directed to a control unit that consequently maintains the controlled electrical appliances in the on state. The use of a sound detector in conjunction with the passive infrared detector makes the occupancy detector of the present invention ideal for deployment in a partitioned room such as a file room, a divided work area, or a bathroom with stalls.

If a person is located behind a partition, and therefore cannot be detected by the infrared sensor, the sound sensor can detect noises made by the person (e.g. flipping pages, conversation, opening drawers, footsteps, etc.) and send a signal to the control unit to maintain the electrical appliance in the on state. If a person is located behind a partition and is generating no detectable sounds for a predetermined period of time, the control unit will cause the appliance (e.g., lights) to turn off. However, a sudden noise (such as a shout) that occurs during a predetermined "grace period" will reactivate the appliance. In order to reduce the incidence of false tripping, only the infrared detector may reactivate the appliance if no sound signal is received by the control unit during the grace period.

The occupancy detector of the present invention employs a sound detector that may be adapted with "automatic gain control" by which the sound sensor can differentiate between background noise and sounds associated with the presence of a person within the area monitored by the detector. In this way, the sound sensor is able to tune out constant background noise such as HVAC supply and computer fans. However, sudden or short term noise exceeding a variable threshold level (such as talking, opening and closing drawers, shuffling papers, etc.) results in a signal being sent to the control unit that maintains the appliances (e.g., lights) in the on state.

The control unit that is used with the occupancy detector of the present invention is associated with a timer that is reset to a predetermined interval each time it receives a signal from the passive infrared sensor or the sound sensor indicating the presence of a person in the area monitored by the occupancy detector. To enhance the flexibility and energy efficiency of the present occupancy detector, the predetermined time interval is preferably adjustable.

The occupancy detector of the present invention is adapted with an additional feature by which a detector signal is temporarily disabled at the same time the off state is initiated. In this way, any signal associated with lights or other electrical appliances being turned off will not re-initiate the on state.

BRIEF DESCRIPTION OF THE FIGURES

The above cited and other objects and advantages of the present invention will be apparent upon consideration of the following detailed descriptions, taken in conjunction with the drawings in which reference characters consistently refer to the same elements and in which:

FIG. 1 shows a housing and wiring configuration that may be used with an occupancy detector of the present invention;

FIG. 2 shows a schematic block diagram of an occupancy detector of the present invention.

DETAILED DESCRIPTION OF THE INVENTION

Figure 3A:
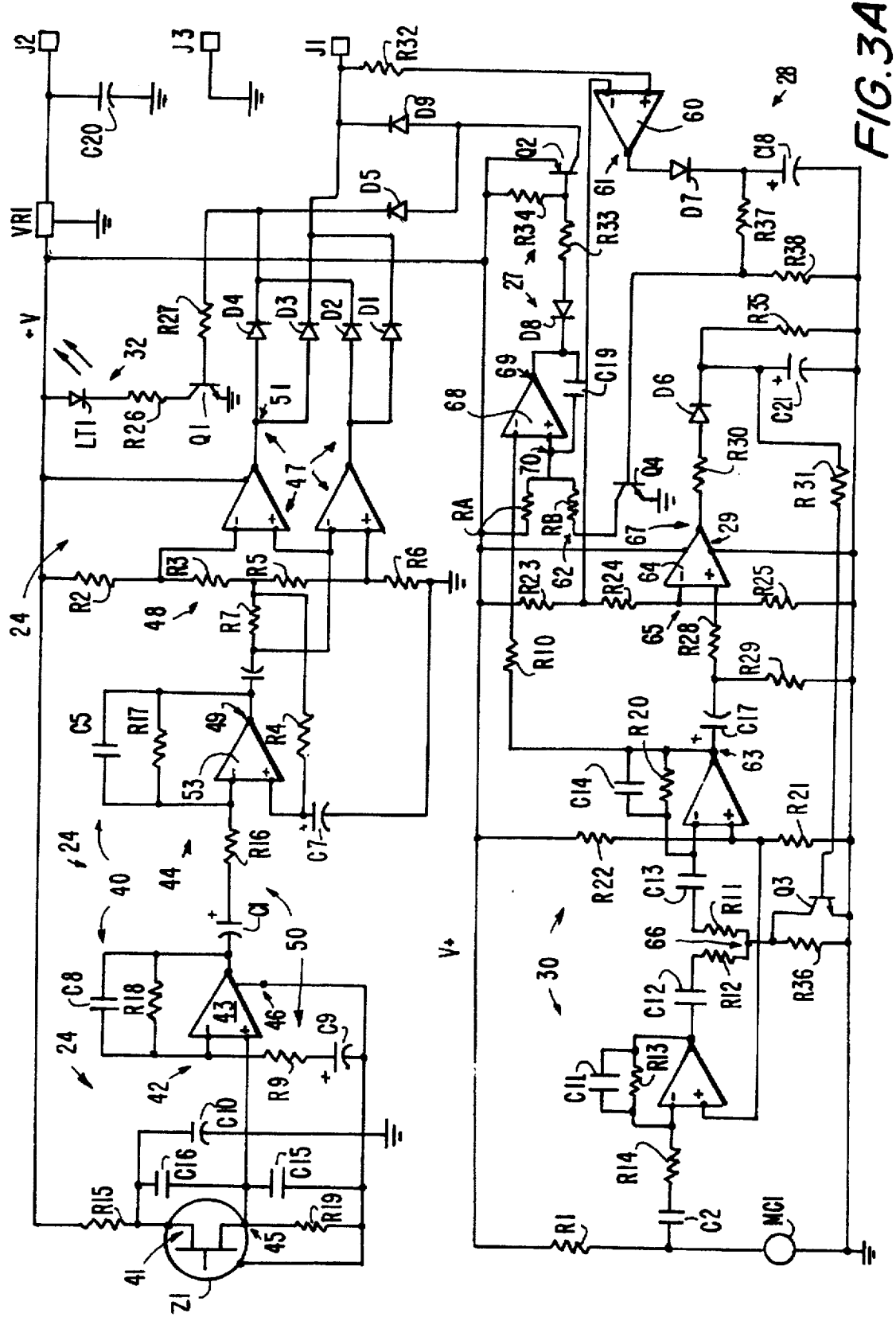
FIGS. 3A and 3B are circuit diagrams that may be used with an occupancy detector of the present invention.

As shown in FIG. 1, occupancy detector 10 includes sensor head 11 that is equipped with a rigid plastic housing 12 and a lens assembly 13. Rigid plastic housing 12 is adapted with mounting screw holes 14 so that sensor head 11 can be deployed on, for example, an appropriate wall or ceiling surface in the area to be monitored. To optimize the performance of occupancy detector 10, sensor head 11 should be mounted at a location remote from fans or HVAC ducts. Rigid plastic housing 12 serves to protect the electronic components (e.g., the microphone, passive infrared sensor, light emitting diode and discrete capacitors and resistors) from breakage through physical contact.

Lens assembly 13 is preferably situated in the center of sensor head 11 projecting outwardly in order to maximize its "field of view." The passive infrared (PIR) detector component of occupancy detector 10 operates by sensing one or more discrete beams of infrared energy. The PIR sensor detects the presence of people as a function of the infrared energy they emit as compared to the background that they obstruct by entering the sensor's field of view. The performance of the PIR detector is optimized by sensing a plurality of beams from different directions.

Lens assembly 13 employs optics to focus the beam(s) sensed by the passive infrared detector. Infrared energy is characterized by long wavelengths—10 to 20 times longer than visible light. Selection of material for the lens assembly is limited because infrared light is unable to pass through many common materials. Infrared light waves, however, are capable of passing through some very thin plastics. Polyethylene is particularly suitable for use in the lens assembly of the present invention.

To produce effective and efficient polyethylene optics, the Fresnel technique may be used. Fresnel lenses produce results similar to simple convex lenses. However, unlike convex lenses, Fresnel lenses only use the curved surfaces which perform the actual bending of the infrared energy waves. In the occupancy detector of the present invention, the curved surfaces of the Fresnel lens are preferably sliced into scores of concentric rings brought down to a single plane. For optimal performance the thickness of the completed lens should be only a few thousandths of an inch.

Wires 15, 16, and 17 run from sensor head 11 to control unit 18. Wire 15 carries the signal input from sensor head 11 to control unit 18. Wire 16 carries current to sensor head 11 and wire 17 operates as a ground. Wire 19 runs from control unit 18 to a controlled electrical appliance (a "load") 20 and, depending on the signal from sensor head 11 and control unit 18, wire 19 controllably provides current to load 20. Wires 21 and 22 run from control unit 18 to AC power 23.

Control unit 18 supplies an appropriate DC voltage to sensor head 11, and receives a specified activating signal from sensor head 11. Timer controls included in control unit 18 function to deactivate load 20 if control unit 18 does not receive an activating signal from sensor head 11 during a specified time interval. Preferably, the timer controls associated with the control unit are adjustable. An example of a control unit that may be used with the present occupancy detector is the CU-20 control unit available from Sensor Switch, Inc. of Wallingford, Conn.

FIG. 2 is a block diagram of an occupancy detector system according to the present invention. A PIR detector 24 sends a signal to a time delay circuit 25 after PIR detector 24 senses a change in infrared energy as compared to the background field of view. Time delay circuit 25 then activates a relay control 26 and a grace period timer 28. Relay control 26 operates to regulate the on/off state of load 20, and grace period timer 28 monitors the output of time delay 25 and provides an enabling signal to a logic circuit 27.

Audio sensor 30 sends detected sound signals to an amplifier 31 for filtering and amplification. The amplifier output is fed to an automatic gain control circuit 29 that further processes the signal to differentiate between sudden, sporadic sounds (such as those a person would make) and background noise (such as, for example, a heating and air conditioning system). This output is then fed back to amplifier 31 to suppress the background noise. Sound signals that are not deemed background noise result in an activating output signal from amplifier 31 to logic circuit 27.

Logic circuit 27, which is initially enabled by grace period timer 28, receives the activating output signal and feeds that signal to time delay circuit 25, which in turn feeds relay control 26, thus maintaining or reactivating the on state of load 20.

When audio sensor 30 and PIR detector 24 no longer transmit signals indicating the presence of a person in the monitored area, time delay circuit 25 "times out" deactivating relay control 26. Load 20 then enters the off state. However, grace period timer 28 will continue to enable logic circuit 27 for a predetermined period of time. In this way, any subsequent activating signals from amplifier 31 are fed through logic circuit 27 to time delay circuit 25, which reactivates both relay control 26 and the on state of load 20.

If no new activating sound signals are detected within the predetermined amount of time, grace period timer 28 times out and disables logic circuit 27. This prevents any additional sound signals from reactivating time delay 25 and relay control 26. Load 20 remains in the off state until a new signal from PIR detector 24 is received. Thus a signal from PIR detector 24 is required to both initially activate the on state of load 20 and reactivate the on state load 20 after expiration of the grace period.

PIR detector 24 and audio sensor 30 share a common power supply but otherwise are controlled as two separate circuits until a point where the output of the PIR and audio sensors are combined through diodes that feed signals to the control unit and a light emitting diode (LED) indicator 32. Specifically, the PIR detector and the audio sensor feed their signals to the control unit through wire 15. The audio sensor also monitors the voltage on wire 15. When the voltage on that wire exceeds a predetermined threshold level, logic circuit 27 is enabled, and when the voltage on that wire is below a predetermined threshold level for more than the specified grace period interval, logic circuit 27 is disabled.

LED indicator 32 is activated when PIR detector 24 or audio sensor 30 generates a signal above a predetermined threshold that indicates the presence of a person in the monitored area. Thus, LED indicator 32 is a mechanism whereby the functioning of the occupancy detector can be easily confirmed.

Figure 3B:
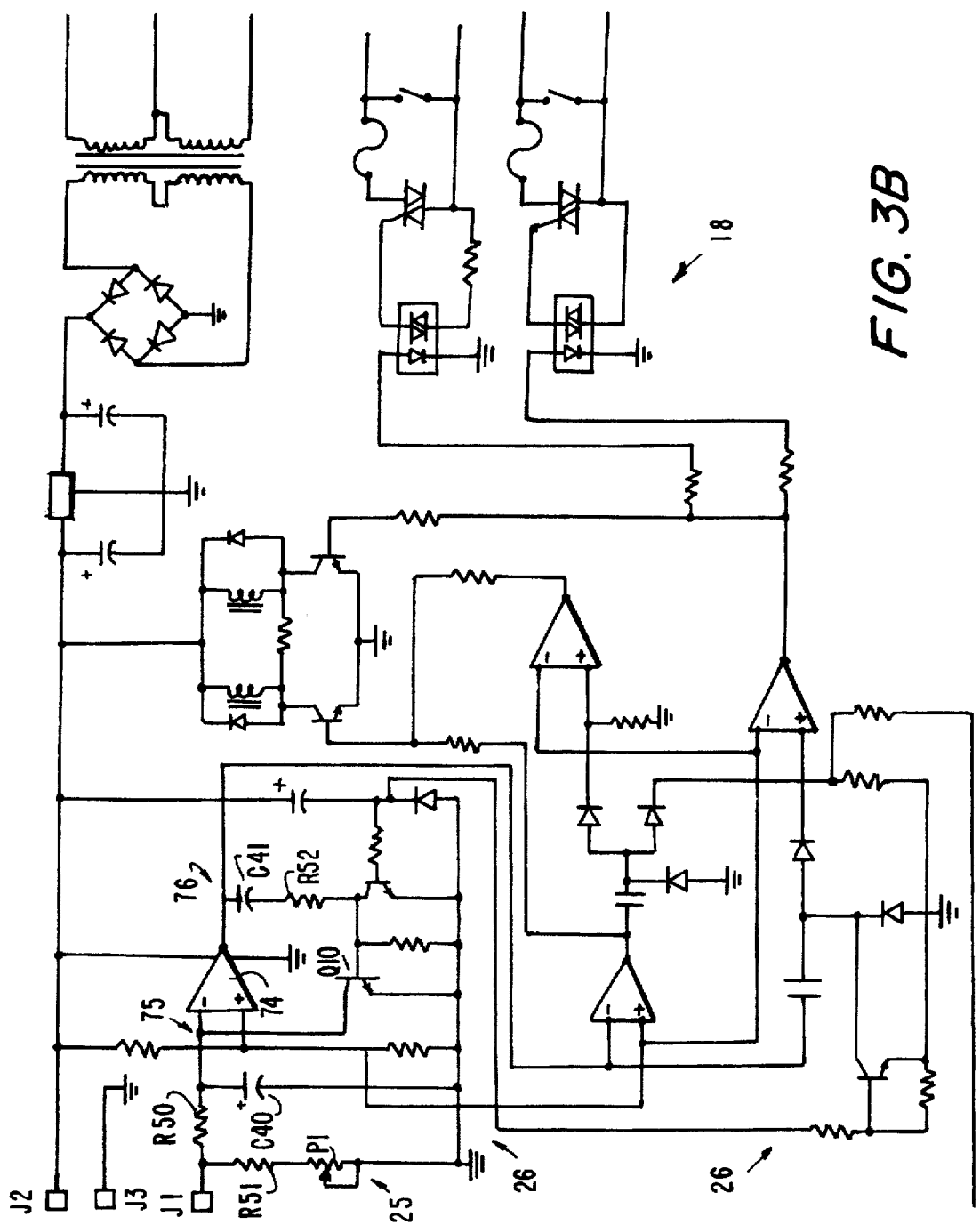

FIG. 3A is a detailed diagram of a circuit that may be used with the sensor head portion of occupancy detector 10, and FIG. 3B is a detailed diagram of a circuit that may be used with the control unit portion of occupancy detector 10. The occupancy detector of the present invention typically operates at low frequencies, and therefore, a stable DC power supply is preferable. Referring to FIG. 3A, voltage regulator VR1 transforms the voltage received from the control unit to the appropriate circuit voltage. The DC supply is further filtered by resistor R15 and capacitor C10.

One component of PIR detector 24 is a piezoelectric chip Z1. Detected changes in temperature are focused by the optics on the chip. The chip, in turn, generates a very small voltage with very high impedance. It is desirable for the piezoelectric chip to be as thin as possible because of the temperature variations to which that chip is exposed. In this way, the thermal mass of the piezoelectric chip is minimized and its thermal time constant is reduced. A field effect transistor (FET) 41 is incorporated within the chip to lower the impedance to an acceptable level.

Feeding the signal from the source resistor R19 into a high impedance amplifier serves to avoid the introduction of dynamic loading with the detector output. One way this may be accomplished is to provide a DC path to the non-inverting input of an operational amplifier (opamp), thereby providing high impedance while also allowing biasing voltage for the opamp without introducing additional "noise."

The detected PIR signal is processed through two stages of voltage amplification. The source voltage at node 45 is connected directly to the non-inverting input of the first amplifier stage 42. Resistor R9 and capacitor C9 of the first stage and resistor R16 and capacitor C1 of the second stage set the low bandpass frequency cut-off. Resistor R18 and capacitor C8 of the first stage and R17 and C5 of the second stage determine the high bandpass frequency cut-off. Capacitors C16 and C15 reduce the effects of electrical transients (electromagnetic interference and radio frequency interference). The second amplifier stage 44 is biased at approximately half the supply voltage by a voltage divider 48 created by resistors R2, R3, R5, and R6.

A window comparator 47 is used to respond to the amplified positive or negative signal deviations. One embodiment of the present invention may employ two comparators, one for each polarity, both of which have an individual reference voltage level. When a signal swings in the appropriate direction with sufficient amplitude, that comparator's output will switch. Capacitor C3 removes the DC component from the second opamp output 49 and only couples signal changes to the comparators. When a person enters the monitored area, a signal is generated and amplified exceeding one of the thresholds and that results in the PIR window comparator output 51 going high. If the background heat remains constant, the amplified signal is well within the established thresholds and output 51 remains low.

Grace period timer (GPT) 28 monitors the voltage at detector output J1. When output J1 is higher than the voltage fixed at the inverting input of GPT opamp 60, output 61 will be high. That output charges capacitor C18 via diode D7 and turns on transistor Q4. This essentially places node 62 at ground, thereby enabling logic circuit 27. When detector output J1 drops below a specified voltage, output 61 of GPT opamp 60 goes low. Diode D7 prevents C18 from discharging through the GPT opamp. Instead, C18 discharges through R37 and R38 providing sufficient base current to keep Q4 on for an additional predetermined time interval. This time interval is determined by the values of C18, R37, and R38. Once C18 is sufficiently discharged, Q4 will turn off, node 62 will go high, and logic circuit 27 is then disabled.

A signal received from sound detector MC1 is also amplified in two stages. The amplified signal is ground referenced at amplifier output 63 by capacitor C17 and resistor R29, and is fed to the non-inverting input of an automatic gain control (AGC) opamp 64. The inverting input 65 is set at a predetermined voltage by resistor string R23, R24, and R25. When the non-inverting input exceeds the predetermined voltage, the output 67 of AGC opamp 64 goes high. Capacitor C21 then slowly charges and begins to turn transistor Q3 on. When C21 reaches a specified voltage, Q3 will clamp C21 preventing the voltage from rising any further. Q3 will also attenuate the signal at node 66 preventing generation of an activating signal. As a continuous signal gets stronger (background noise gets louder), more voltage is produced and Q3 attenuates the signal at node 66 further. Amplifier output 63 therefore remains constant. However, a single, loud noise (above background noise) will produce a larger amplifier output 63 resulting in an activating signal, because the AGC will not have enough time to adjust to that stronger, sudden signal. When all detected sound ceases, AGC opamp output 67 switches low, and C21 then discharges quickly through resistor R35.

The activating signal from amplifier output 63 feeds into the inverting input of logic opamp 68. Assuming the enabling signal from the GPT is received at non-inverting input 70, logic opamp output 69 switches from a high to a low which turns on transistor Q2. Transistor Q2 then feeds a signal of predetermined voltage through diode D9 to detector output J1 switching it high. This will maintain or reactivate the on state of the load. Capacitor C19 feeds back the output to non-inverting opamp input 70 resulting in an increase in pulse width.

Referring to FIG. 3B, an initial activating signal from the sensor head causes J1 to switch from a low to a high charging a timing capacitor C40 to a predetermined voltage that then activates the relay control. Diode D3 (FIG. 3A) prevents the sensor from becoming a discharge path for the timing capacitor. When activating signals are no longer received, the relay control remains activated until timing capacitor C40 slowly discharges through R50, R51, and potentiometer P1, eventually pulling J1 low. The discharge rate is determined by the values of C40, R50, R51 and P1, and can be adjusted by varying P1 at the front panel of control unit 18.

When J1 switches low, output 76 of relay control opamp 74 then switches from a low to a high turning transistor Q10 on. Transistor Q10 then momentarily clamps input node 75 to ground preventing any activating signal, such as one caused by the sound of the load turning off, from reactivating the relay control and the load. Thus, both PIR detector 24 and audio sensor 30 are in effect momentarily disabled. When capacitor C41 charges up, Q10 turns off, and node 75 is then released allowing opamp 74 to respond to activating signals received from the sensor head.

The skilled worker will appreciate that the present invention can be practiced by other than the described embodiments, which are presented for purposes of illustration and not of limitation, and the present invention is limited only by the claims that follow.

We claim:

1. An apparatus for regulating the on/off status of an electrical device comprising:
   a first sensing means including a passive infrared sensor that is operable to generate an electronic signal indicating the presence of a person within a defined area;
   a second sensing means including a sound sensor that is operable to generate an electronic signal indicating the presence of sound phenomena within the defined area;
   a control means operatively associated with a timer wherein the control means is in electronic communication with the first and second sensing means and the electrical device, and wherein the control means is operable to maintain the electrical device in an on state when the control means receives from the first sensing means a signal indicating the presence of a person within the defined area, or when the control means receives from the second sensing means a signal above a threshold level indicating the presence of sound phenomena within the defined area, wherein:
   a) the control means is operable to initiate an off state of the electrical device when, throughout a first predetermined time interval, the first sensing means does not generate a signal indicating the presence of a person in the defined area and the second sensing means does not generate a signal above the threshold level indicating the presence of sound phenomena within the defined area;
   b) the control means is operable to reinitiate the on state of the electrical device if it receives from the second sensing means a signal above the threshold level indicating the presence of sound phenomena within the defined area during a second predetermined time interval following the initiation of the off state of the electrical device; and
   c) the control means is operable to reinitiate the on state of the electrical device only by receipt of a signal from the first sensing means indicating the presence of a person within the defined area if a signal from the second sensing means above the threshold level is not received by the control means during the second predetermined time interval following the initiation of the off state of the electrical device.

2. An apparatus according to claim 1 wherein the second sensing means is operable to produce a signal in response to the presence of background noise sound phenomena within the defined area that is distinguishable from a signal produced by the second sensing means in response to sudden sound phenomena within the defined area.

3. An apparatus according to claim 1 wherein a signal produced by the second sensing means in response to background noise sound phenomena within the defined area does not cause the control means to maintain the electrical device in the on state.

4. An apparatus according to claim 1 wherein a signal produced by the second sensing means in response to background noise sound phenomena within the defined area during the second predetermined time interval following the initiation of the off state of the electrical device does not cause the control means to reinitiate the on state of the electrical device.

5. An apparatus according to claim 1 wherein a signal produced by the second sensing means in response to sudden sound phenomena within the defined area causes the control means to maintain the electrical device in the on state.

6. An apparatus according to claim 1 wherein a signal produced by the second sensing means in response to sudden sound phenomena within the defined area during the second predetermined time interval following the initiation of the off state of the electrical device causes the control means to reinitiate the on state of the electrical device.

7. An apparatus according to claim 1 wherein the first predetermined time interval is adjustable.

8. An apparatus according to claim 1 wherein the threshold level for the signal produced by the second sensing means is adjustable.

9. An apparatus according to claim 1 wherein the second sensing means is in electronic communication with the first sensing means.

10. An apparatus according to claim 1 wherein the first sensing means is adapted to be momentarily disabled substantially coincident with the initiation of the off state of the electrical device.

11. An apparatus according to claim 1 wherein the second sensing means is adapted to be momentarily disabled substantially coincident with the initiation of the off state of the electrical device.

12. An apparatus according to claim 10 or 11 wherein a sound associated with the initiation of the off state of the electrical device does not cause the control means to reinitiate the on state of the electrical device as a result of receiving a signal from the second sensing means.

13. An apparatus for regulating the on/off status of an electrical device comprising:
   a first sensing means including a passive infrared sensor that is operable to generate an electronic signal indicating the presence of a person within a defined area;
   a second sensing means including a sound sensor that is operable to generate an electronic signal indicating the presence of sound phenomena within the defined area;
   a control means operatively associated with a timer wherein the control means is in electronic communication with the first and second sensing means and the electrical device, and wherein the control means is operable to maintain the electrical device in an on state when the control means receives from the first sensing means a signal indicating the presence of a person within the defined area, or when the control means receives from the second sensing means a signal above a threshold level indicating the presence of sound phenomena within the defined area wherein:
   a) the control means is operable to initiate an off state of the electrical device when, throughout a predetermined time interval, the first sensing means does not generate a signal indicating the presence of a person in the defined area and the second sensing means does not generate a signal above the threshold level indicating the presence of sound phenomena within the defined area; and
   b) the second sensing means is operable to produce a signal in response to the presence of background noise sound phenomena within the defined area that is distinguishable from a signal produced by the second sensing means in response to sudden sound phenomena within the defined area.

14. An apparatus according to claim 13 wherein a signal produced by the second sensing means in response to background noise sound phenomena within the defined area does not cause the control means to maintain the electrical device in the on state.

15. An apparatus according to claim 13 wherein a signal produced by the second sensing means in response to sudden sound phenomena within the defined area causes the control means to maintain the electrical device in the on state.

16. An apparatus according to claim 13 wherein the threshold level for the signal produced by the second sensing means is adjustable.

17. An apparatus according to claim 13 wherein the predetermined time interval is adjustable.

18. An apparatus according to claim 13 wherein the second sensing means is in electronic communication with the first sensing means.

19. An apparatus according to claim 13 wherein the first sensing means is adapted to be momentarily disabled substantially coincident with the initiation of the off state of the electrical device.

20. An apparatus according to claim 13 wherein the second sensing means is adapted to be momentarily disabled substantially coincident with the initiation of the off state of the electrical device.

21. An apparatus according to claim 19 or 20 wherein a sound associated with the initiation of the off state of the electrical device does not cause the control means to reinitiate the on state of the electrical device as a result of receiving a signal from the second sensing means.

* * * * *